Feb. 20, 1940.  C. I. BOHMER ET AL  2,191,419
WATER SUPPLY AND MEASURING TANK FOR CONCRETE MIXERS
Filed Jan. 16, 1939  2 Sheets-Sheet 1

INVENTORS
Clarence I. Bohmer.
Arthur E. Davis.
BY
*Corbett + Mahoney*
ATTORNEYS.

Feb. 20, 1940. C. I. BOHMER ET AL 2,191,419
WATER SUPPLY AND MEASURING TANK FOR CONCRETE MIXERS
Filed Jan. 16, 1939 2 Sheets-Sheet 2
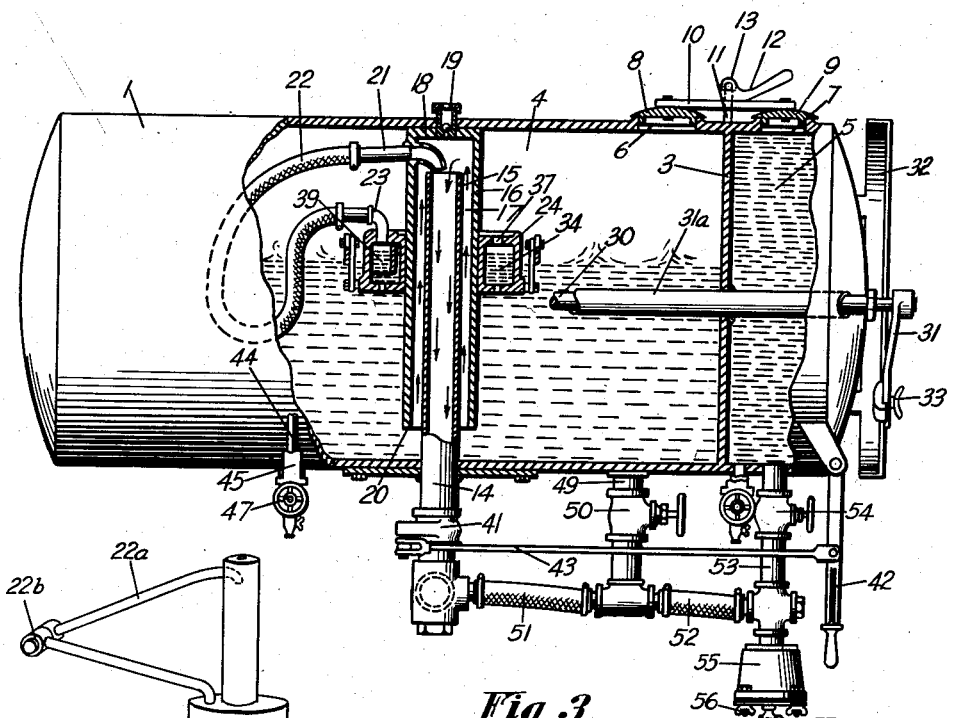
Fig. 3
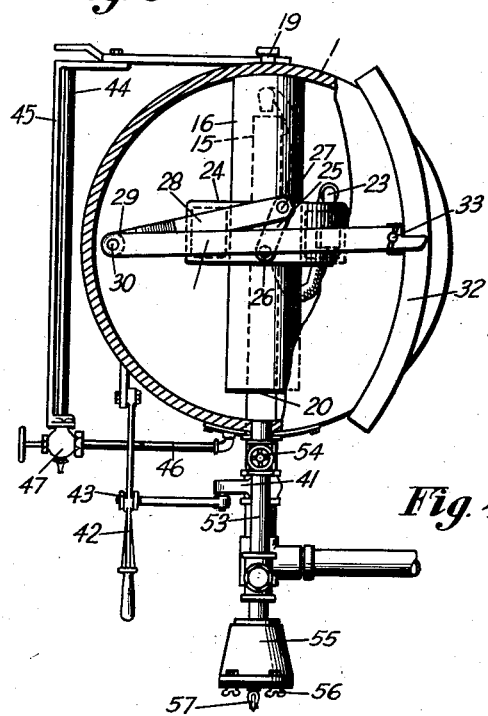
Fig. 6
Fig. 4
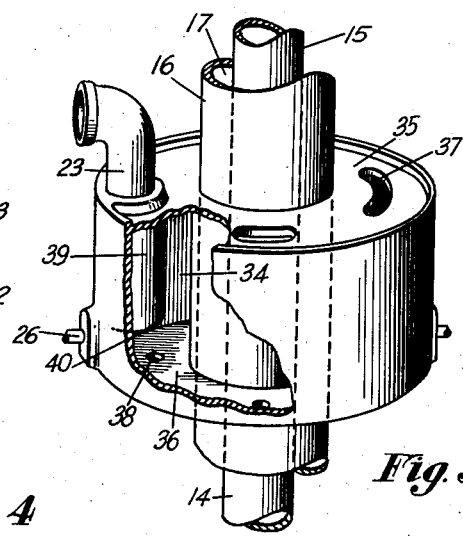
Fig. 5
INVENTORS
Clarence I. Bohmer.
Arthur E. Davis.
BY
ATTORNEYS.

Patented Feb. 20, 1940

2,191,419

UNITED STATES PATENT OFFICE 2,191,419

WATER SUPPLY AND MEASURING TANK FOR CONCRETE MIXERS

Clarence I. Bohmer and Arthur E. Davis, Columbus, Ohio, assignors to The Jaeger Machine Company, Columbus, Ohio, a corporation of Ohio Application January 16, 1939, Serial No. 251,054

9 Claims. (Cl. 221—95)

Our invention relates to a water supply tank and measuring tank for concrete mixers. It has to do, more particularly, with a water supply tank and associated mechanism adapted to be disposed in cooperative relationship with a mixer and adapted to supply predetermined quantities of water to the mixer.

One of the objects of our invention is to provide means for supplying water to a mixer in predetermined amounts which is very accurate.

Another object of our invention is to provide a water-supplying and measuring tank of the type indicated which is of such a nature that extreme splashing and surging of the water within the tank or a tilted tank will have substantially no effect on the accuracy of the tank, thereby rendering the tank particularly suitable for use on truck mixers.

Another object of our invention is to provide a tank of the type indicated which may be adjusted accurately, quickly and easily to supply a predetermined amount of water to the mixer and to vary this predetermined amount as desired.

In its preferred form our invention contemplates the provision of a water tank adapted to be associated with a mixer and which is particularly suitable for use with a truck mixer or wherever extreme splashing and surging conditions are met. The tank is provided with a main compartment for supplying water to the mixer to be used in the mixing operation and with a secondary compartment which is adapted to supply wash water to the mixer in order to permit flushing thereof after the material has been discharged therefrom. The main compartment of the tank has means associated therewith for supplying a predetermined amount of water to the mixer. This means is of such a nature that it may be quickly and accurately adjusted to vary the predetermined amount of water supplied to the mixer. This means preferably takes the form of a siphon arrangement by means of which a predetermined amount of water is withdrawn from the tank. After a predetermined amount of the water is withdrawn, the siphon is broken interrupting flow of water from the tank. In order to break the siphon after a predetermined amount of water has been withdrawn from the tank, we provide means for supplying air to the siphon at the top thereof. This means is of such a nature that its accuracy will not be affected to any appreciable extent by extreme splashing or surging of the water within the tank or by tilting the tank.

Various other objects and advantages will be apparent from the following description.

The preferred embodiment of our invention is illustrated in the accompanying drawings wherein similar characters of reference designate corresponding parts and wherein:

Figure 3 is a view partly in side elevation but mainly in vertical section illustrating our tank.

Figure 4 is an end view of the structure illustrated in Figure 3.

Figure 5 is a perspective view of the member which allows air to enter the siphon after a predetermined amount of water has been withdrawn from the tank.

Figure 6 is a perspective view of a modified portion of our device.

Figure 1:
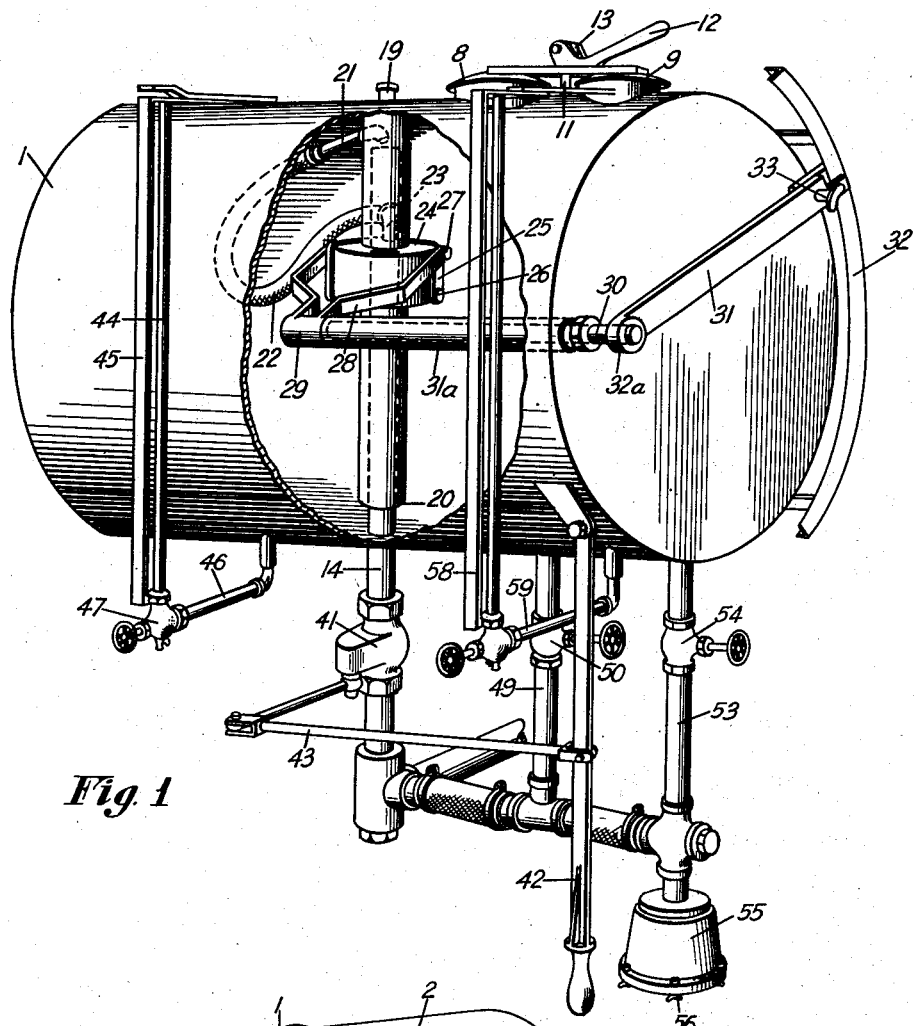
Figure 1 is a perspective view, partly broken away, of a water-supplying and measuring tank and associated parts constructed in accordance with our invention.

With reference to the drawings, we have illustrated a tank 1 of cylindrical form. This tank is adapted to be mounted adjacent the mixer to be supplied with water. For example, as illustrated in Figure 1, the tank may be mounted in front of the mixing drum 2 of a truck mixer. It is preferably disposed at a comparatively high point so that the water will flow from the tank into the drum by gravity.

As illustrated best in Figure 3, adjacent one end thereof the tank is provided with a vertical partition 3. This partition divides the tank into a main compartment 4 and a wash water compartment 5. Water in predetermined amounts is adapted to be withdrawn from the compartment 4 and supplied to the material in the mixing drum for the mixing operation. After the material is discharged from the mixing drum, water is adapted to be withdrawn from the wash water compartment 5 and to be used for flushing the mixing drum. A filling opening 6 is provided in the top of the tank for filling the compartment 4 and a filling opening 7 is provided in the top of the tank for filling the compartment 5. These openings are adapted to be closed by caps 8 and 9, respectively, each of which is pivoted to the end of a horizontally disposed plate 10. This plate 10 is pivoted to an upstanding rod or bolt 11 disposed between the openings 6 and 7. The plate 10 is free to swing in a horizontal plane and is permitted to move vertically to a limited extent. A cam member 12 is pivoted to the upper end of the rod 11 as at 13.

When the cam member 12 is swung upwardly, the member 10 may be moved vertically and swung horizontally to remove the caps from the openings. When it is desired to close these openings, the caps may be swung back into position and when the cam 12 is swung downwardly they will be tightly clamped in position.

As previously indicated, we provide a siphon arrangement for withdrawing a predetermined amount of water from the compartment 4. This siphon arrangement may be quickly and accurately adjusted to vary the predetermined amount of water withdrawn from the tank. After a predetermined amount of water is withdrawn from the tank, air is supplied to the top of the siphon in order to interrupt the flow of water from the tank.

Thus, an outlet or discharge pipe 14 extends upwardly through the lower end of the tank and terminates at a point 15 spaced from the upper end of the tank. This pipe 14 is disposed substantially at the center of the mixing compartment 4. Its lower end is suitably connected to the mixing drum to be supplied with water. The pipe 14 is concentrically disposed within a tubular member 16 of larger diameter than the member 14 so that an annular space 17 is formed between these two members. The upper end of the member 16 is closed by a wall member 18. A ball check valve 19 is located in the top of the member 16 and tank 1 in order to permit escape of air from the upper end of member 16 when necessary. As indicated, the uppermost end 15 of the pipe 14 is spaced below the upper end of the member 16. The lower end 20 of the member 16 is spaced above the bottom of the tank, as indicated.

It will be apparent that when the siphon is functioning, the water will be withdrawn from the compartment 4 at the bottom thereof, past the lower end 20 of member 16, upwardly through the annular space 17, around the upper end 15 of the pipe 14, downwardly through the pipe 14 and will be conducted to the mixing drum.

To interrupt the flow of water from the compartment 4 after a predetermined amount of water had been discharged therefrom, we provide means for breaking the siphon at the proper instant. This means takes the form of a unit for breaking the siphon by supplying air thereto at the top thereof. It will be noted that we have provided an elbow member 21 passing through the upper end of the member 16 and terminating over the upper end of the member 14. The outer end of this member 21 is connected by a flexible conduit 22 to an elbow member 23 which is connected to an annular container 24.

The member 24 is disposed in surrounding relationship to the member 16 and is adapted to move vertically relative thereto. Means is provided for positively moving this member 24 vertically and holding it in any desired position. This means comprises a pair of link members 25 having their lower ends pivoted to the member 24 at diametrically opposed points 26. The upper ends of these links are pivoted at 27 to the outer ends of a yoke member 28. This yoke member has a sleeve-like portion 29 which is keyed on the inner end of a shaft 30. This shaft is horizontally disposed and is rotatable within a sleeve 31a which is non-rotatably supported by the partition 3 in the end of the tank. The outer end of the shaft 30 has an arm 31 keyed thereon as at 32a. The outer end of this arm 31 is adapted to traverse a segmental member 32. This member 32 may be calibrated in pounds or gallons to indicate the amount of water which will be withdrawn from the compartment 4 and which is determined by the vertical position of the member 24 within the compartment. A suitable clamping device 33 is provided at the end of the arm 31 for clamping the arm to the member 32 in any position to which it is adjusted.

The structure of the member 24 is illustrated best in Figures 3 and 5. It will be noted that there is an annular chamber 34 formed within this member. Both the top and the bottom of this chamber are substantially closed by wall members 35 and 36 respectively. The wall member 35 has a plurality of openings 37 formed therein, while the wall member 36 has a plurality of openings 38 formed therein. The total area of the openings 37 is preferably substantially greater than the total area of the openings 38 for a purpose which will be described hereinafter. The elbow member 23 which is connected to hose 22 communicates with the upper end of a tubular member 39 disposed within the chamber 34. This member 39 terminates at a point 40 spaced slightly above the bottom wall member 36.

The lower end of the discharge line 14 is provided with a valve 41 of any suitable type which may be actuated to close the line 14 or to permit water to flow therefrom. This valve may be operated by a control lever 42 which is connected thereto by suitable linkage 43. A visible gauge is provided for indicating the amount of water in the compartment 4. This gauge comprises a glass tube 44 which is vertically disposed and supported on the tank. It is adapted to cooperate with a member 45 which may be suitably calibrated. The tube 44 is connected to the lower end of the compartment 4 by means of a pipe 46. A shut-off valve 47 is provided between the pipe 46 and the tube 44.

In supplying a predetermined amount of water from the mixing compartment 4 to the mixer, the compartment 4 is first completely filled with water. During filling, air will escape through valve 19. Then the arm member 31 is swung on the segment 32 until the outer end of the arm is adjacent the mark on the member 32 which will indicate the amount of water it is desired to supply to the mixing drum. As previously stated, swinging the arm 31 will move the member 24 vertically to the proper position. The valve 41 is then opened to permit the water to flow from the pipe 14. The water will flow from the tank by gravity and the water level will be gradually lowered in the tank. However, the siphon will not be broken until the water level in the chamber 34 of member 24 reaches the lower end 40 of the member 39. At this time air will flow upwardly through the member 39, through the conduit 22 and into the upper end of the member 16, breaking the siphon. At this time the flow of water from the compartment 4 will be interrupted. To again start the flow of water from the tank it will be necessary to fill the compartment 4 so that the water level in the tank will be above the upper end 15 of the pipe 14.

One of the important advantages of our device resides in the fact that the accuracy of the means for supplying air to the siphon and interrupting the flow of water will not be affected to any appreciable extent by splashing or surging of the water within the compartment 4 or by tilting of the tank. The air will not be supplied to the siphon until the water level in the chamber 34 is below the lower end 40 of member 39. Consequently, during extreme splashing or surging of the water, even though the member 24 is completely uncovered by the water, air will not be supplied through the member 39 since chamber 34 will still have water therein. It will take some time for the water to flow from the chamber 34 through the openings 38, even though the member 24 is completely uncovered by the water. The area of the openings 37 is greater than the area of the openings 38 so that splashing of the water in the compartment will cause it to flow into the chamber 34 through the openings 37 quicker than it will flow therefrom through the openings 38. The same is true if the tank is tilted for a while and then brought back to horizontal position. During this interval, there will still be water in the compartment 4 which will prevent breaking of the siphon. The siphon will not be broken, since the chamber 34 will not be emptied, until the water level in the compartment reaches the predetermined point which is determined by the vertical position of the member 24.

Figure 2:
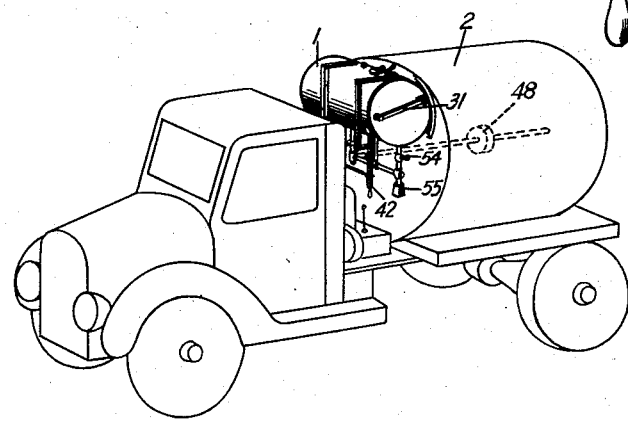
Figure 2 is a perspective view of a truck mixer showing our tank in position thereon.

As previously indicated, the pipe 14 may be suitably connected to the mixing drum. In Figure 2 it is shown connected to a water-distributing device 48 within the mixing drum 2.

An additional outlet pipe 49 is connected to the bottom of the compartment 4 and is under the control of a manually operated valve 50. The lower end of this pipe is connected by a flexible conduit 51 to the lower end of the pipe 14. The valve 50 may be opened after the flow of water from the compartment 4 has been interrupted by the siphon-breaking device, to supply additional small amounts of water to the mixer for tempering purposes if desired. The pipe 49 is also connected by a flexible conduit 52 to a vertically disposed pipe 53 adjacent the lower end thereof. This pipe 53 has its upper end connected to the bottom of the wash water compartment 5. A valve 54 is interposed in the pipe 53 for controlling flow of water from the compartment 5. A sediment trap in the form of a chamber 55 is connected to the lower end of the pipe 53. The bottom of this chamber 55 is removably secured in position by means of bolts and nuts 56. A valve cock 57 is provided for draining the compartment 55 before cleaning. It will be noted from Figure 3 that the conduits 51 and 52 are inclined towards the sediment chamber 55 so that the sediment will tend to go into the chamber 55. When supplying wash water to the mixer, the valve 54 is opened permitting the water to flow through pipe 53, conduits 52 and 51 and then into the lower end of the pipe 14. A gauge 58 like that previously described is connected by a pipe 59 to the lower end of the compartment 5 and will indicate the level of the water within the compartment.

Instead of providing flexible conduit 22, we may provide the pipe structure 22a illustrated in Figure 6 for connecting members 16 and 24. This pipe structure merely embodies two sections of pipe connected together at one end by a pivot point 22b and connected at their other ends to members 16 and 24.

It will be apparent from the preceding description that we have provided a water-supplying and measuring tank having many advantages. The device is extremely accurate and will not be affected to any appreciable extent by splashing or surging of the water within the tank or by the tank being tilted from one side to the other. This renders the device particularly suitable for use on truck mixers. In order to withdraw water from the tank by the siphon arrangement, it is necessary that the tank be full when this operation is started. Due to the fact that the amount of water to be supplied to the mixer is measured from the top down, greater accuracy is ensured. Even if the drain valve is left open after the air enters the siphon and the tank is rocked, additional water will not be discharged therefrom.

Although in the preceding description and the following claims we have referred to our device as being useful for supplying water in predetermined amounts to concrete mixers or the like, it is to be understood that it may be employed to supply other liquids in predetermined amounts to any suitable member.

Many other advantages will be apparent from the preceding description, the drawings and the following claims.

Having thus described our invention, what we claim is:

1. Apparatus for supplying water in predetermined amounts comprising a tank for containing the water, a siphon arrangement for withdrawing water from the tank, said siphon arrangement comprising a vertically disposed discharge pipe extending upwardly through the tank and terminating a short distance from the top of the tank and a tubular member disposed in surrounding spaced relationship to the first pipe having its upper end closed and having its lower end open, means for breaking the siphon at a predetermined time to interrupt flow of water from the tank, said means comprising an annular member disposed in surrounding relationship to said tubular member and being vertically adjustable, means disposed outside of the tank for vertically adjusting said member, said member having an annular chamber formed therein, the upper wall of said chamber being provided with a plurality of inlet openings and the lower wall of said chamber being provided with a plurality of discharge openings, the total area of the inlet openings being greater than that of the discharge openings, and a conduit connecting said chamber to the upper end of said tubular member, said conduit terminating in a portion extending downwardly into said chamber but terminating at a point spaced from the bottom wall thereof.

2. Apparatus for supplying water to a mixer or the like comprising a tank, said tank being divided into a main compartment and a wash water compartment, a discharge pipe leading downwardly from the main compartment, a discharge pipe leading downwardly from the wash water compartment, said pipes being connected together by an inclined conduit, and a sediment chamber connected to the lower end of said conduit.

3. Apparatus for supplying water to a mixer or the like comprising a tank, said tank being divided in a main compartment and a wash water compartment, a discharge pipe leading downwardly from the main compartment, a discharge pipe leading downwardly from the wash water compartment, and an additional discharge pipe leading downwardly from the main compartment, the lower ends of all of said pipes being connected to an inclined conduit, and a sediment chamber connected to the lower end of said conduit.

4. Apparatus for supplying water in predetermined amounts comprising a tank for containing the water, a siphon arrangement for withdrawing water from the tank, said siphon arrangement comprising a vertically disposed discharge pipe extending upwardly through the tank and terminating a short distance from the top of the tank and a pipe disposed in surrounding spaced relationship to the first pipe having its upper end closed and having its lower end open, means for breaking the siphon at a predetermined time to interrupt flow of water from the tank, said means comprising a member disposed in surrounding relationship to the outer pipe and being vertically adjustable, means disposed outside of the tank for vertically adjusting said member, said member having a chamber formed therein, the upper wall of said chamber being provided with a plurality of inlet openings and the lower wall of said chamber being provided with a plurality of discharge openings the total area of the inlet openings being greater than that of the discharge openings, and a conduit connecting the lower end of said chamber to the upper end of said outer pipe.

5. Apparatus for supplying water in predetermined amounts comprising a tank for containing the water, a siphon arrangement for withdrawing water from the tank, said siphon arrangement comprising a vertically disposed discharge pipe extending upwardly through the tank and terminating a short distance from the top of the tank and a pipe disposed in surrounding relationship to the first pipe having its upper end closed and having its lower end open, means for breaking the siphon at a predetermined time to interrupt flow of water from the tank, said means comprising a member disposed in surrounding relationship to the outer pipe and being vertically adjustable, means disposed outside of the tank for vertically adjusting said member, said member having a chamber formed therein, said chamber being provided with openings for permitting flow of water between the tank and said member, and a conduit connecting said chamber to the upper end of said outer pipe, said conduit terminating in a portion extending downwardly into said chamber but terminating at a point spaced from the bottom wall thereof.

6. Apparatus for supplying water in predetermined amounts comprising a tank for containing the water, a siphon arrangement for withdrawing water from the tank, said siphon arrangement comprising a vertically disposed discharge pipe extending upwardly through the tank and terminating a short distance from the top of the tank and a pipe disposed in surrounding relationship to the first pipe having its upper end closed and having its lower end open, means for breaking the siphon at a predetermined time to interrupt flow of water from the tank, said means comprising a member disposed in surrounding relationship to the outer pipe and being vertically adjustable, means disposed outside of the tank for vertically adjusting said member, said member having a chamber formed therein, said chamber being provided with openings for permitting flow of water between the tank and said chamber, and a conduit connecting the lower end of said chamber to the upper end of said outer pipe.

7. Apparatus for supplying water in predetermined amounts comprising a tank for containing the water, a siphon arrangement for withdrawing water from the tank, means for breaking the siphon at a predetermined time to interrupt flow of water from the tank, said means comprising a container supported within the tank which will have water therein until the water in the tank reaches a predetermined level so that splashing and surging of the water within the tank will have substantially no effect on the siphon, said container being vertically adjustable within the tank, means disposed outside of the tank for vertically adjusting said container and holding it in adjusted position, said container being provided with an opening to permit flow of water between the tank and the container, and means for connecting said container to the upper end of the siphon.

8. Apparatus for supplying water in predetermined amounts comprising a tank for containing water, a siphon arrangement for withdrawing water from the tank, means for breaking the siphon at a predetermined time to interrupt flow of water from the tank, said means comprising a container supported within the tank which will have water therein until the water in the tank reaches a predetermined level so that splashing and surging of the water within the tank will have substantially no effect on the siphon, said container being vertically adjustable within the tank, means disposed outside of the tank for vertically adjusting said container and holding it in adjusted position, said container being provided with inlet openings at the top thereof and discharge openings at the bottom thereof to permit flow of water between the tank and said container, and means connected to the upper end of the siphon and to the lower end of said container for allowing air to enter the siphon when said container is substantially emptied of water.

9. Apparatus for supplying water in predetermined amounts comprising a tank for containing the water, a siphon arrangement for withdrawing water from the tank, means for breaking the siphon at a predetermined time to interrupt flow of water from the tank, said means comprising a container supported within the tank which will have water therein until the water in the tank reaches a predetermined level so that splashing and surging of water within the tank will have substantially no effect on the siphon, said container being vertically adjustable within the tank, means disposed outside of the tank for vertically adjusting said container and holding it in adjusted position, said container being provided with inlet openings at the top thereof and discharge openings at the bottom thereof to permit flow of water between the tank and said container, the total area of said inlet openings being greater than the total area of the discharge openings, and means connected to the upper end of the siphon and the lower end of said container for allowing air to enter the siphon when said container is substantially emptied of water.

CLARENCE I. BOHMER.
ARTHUR E. DAVIS.